US008526759B2

(12) United States Patent
Lee et al.

(10) Patent No.: US 8,526,759 B2
(45) Date of Patent: Sep. 3, 2013

(54) METHOD OF FILLING A HOLE IN A VIRTUAL VIEW IMAGE WARPED FROM A TWO-DIMENSIONAL IMAGE

(75) Inventors: Pei-Jun Lee, New Taipei (TW); Zhen-Rong Shih, Changhua County (TW)

(73) Assignee: National Chi Nan University, Nantou (TW)

( * ) Notice: Subject to any disclaimer, the term of this patent is extended or adjusted under 35 U.S.C. 154(b) by 290 days.

(21) Appl. No.: 13/178,404

(22) Filed: Jul. 7, 2011

(65) Prior Publication Data
US 2012/0230603 A1  Sep. 13, 2012

(30) Foreign Application Priority Data
Mar. 8, 2011  (TW) .............................. 100107730 A (51) Int. Cl.
*G06K 9/40*  (2006.01)
(52) U.S. Cl.
USPC ........................................................ 382/275
(58) Field of Classification Search
USPC ................... 345/422; 352/86; 382/215, 275
See application file for complete search history.

(56) References Cited

PUBLICATIONS

Luo et al., Depth-aided inpainting for disocclusion restoration of multi-view images using depth-image-based rendering; Journal of Zhejiang University Science A; Oct. 2009, pp. 1738-1749.*
Criminisi et al., Region Filling and Object Removal by Exemplar-Based Image Inpainting; IEEE Transactions on Image Processing, Sep. 2004, pp. 1200-1212, vol. 13 No. 9.*

* cited by examiner

*Primary Examiner* — Gregory F Cunningham
(74) *Attorney, Agent, or Firm* — Christie, Parker & Hale, LLP (57) ABSTRACT

In a method of filling a hole in a virtual view image warped from a two-dimensional image, the hole is detected to determine the number of pixels in the hole and to obtain position information corresponding to the hole. For each pixel in the hole, a target image block containing at least a corresponding pixel in the hole, and search image blocks corresponding to the target image block are selected from the virtual view image. Central pixels of the search image blocks are disposed on the upside, downside, right and left of a central pixel of the target image block. Those of the search image blocks detected to be available are estimated using a predetermined estimation manner to determine one of the available search image blocks as a candidate image block. All pixels in the target image block are respectively filled with all pixel values in the candidate image block.

12 Claims, 9 Drawing Sheets

METHOD OF FILLING A HOLE IN A VIRTUAL VIEW IMAGE WARPED FROM A TWO-DIMENSIONAL IMAGE

CROSS-REFERENCE TO RELATED APPLICATION

This application claims priority to Taiwanese Application No. 100107730, filed on Mar. 8, 2011.

BACKGROUND OF THE INVENTION

1. Field of the Invention

The invention relates to an image compensating method, and more particularly to a method for filling a hole in a virtual view image warped from a two-dimensional image.

2. Description of the Related Art

Figure 1:
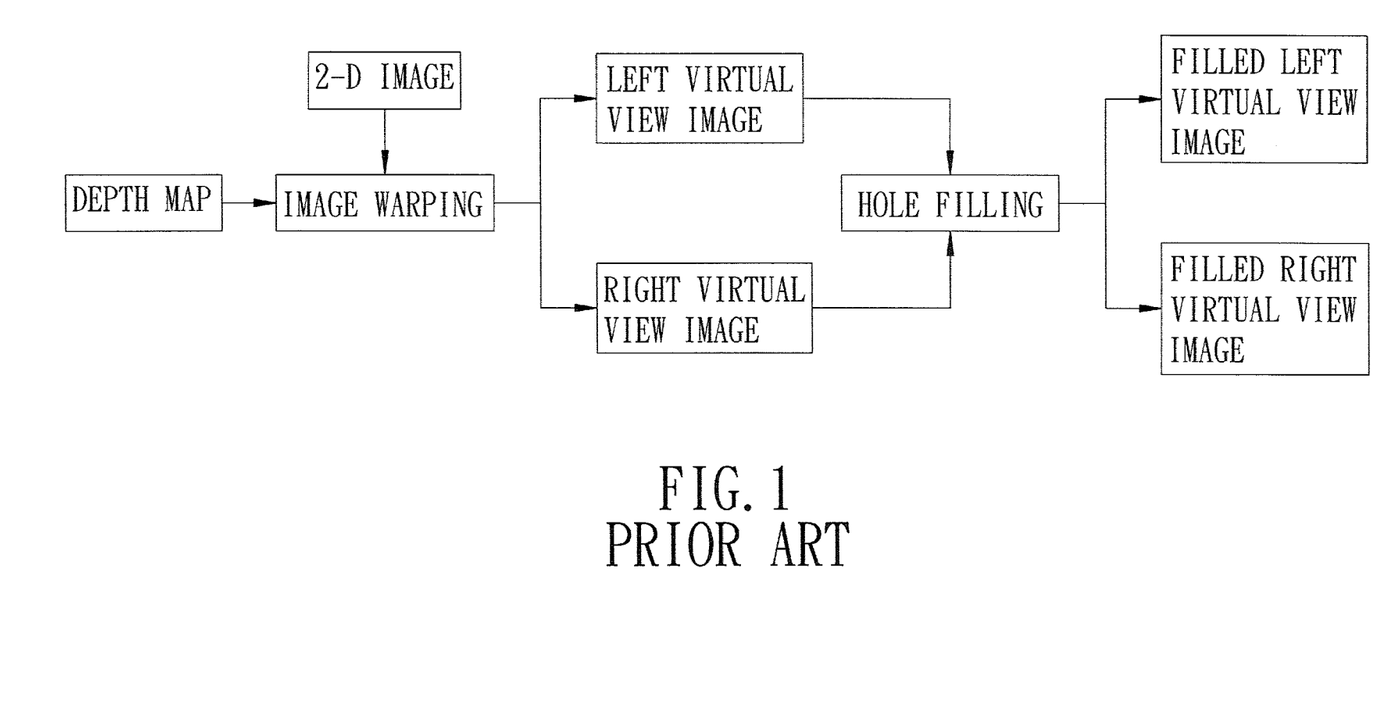
FIG. 1 is a flow chart illustrating how a two-dimensional image is converted into a three-dimensional image using the DIBR technology.
Figure 2:
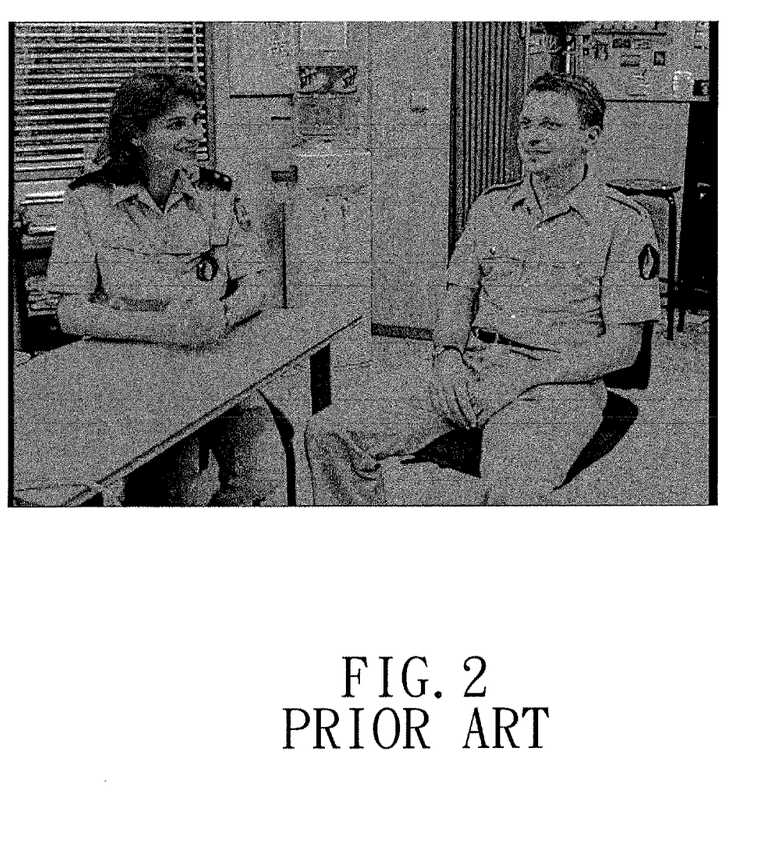
FIG. 2 is a picture showing an example of the two-dimensional image used in the DIBR technology.
Figure 3:
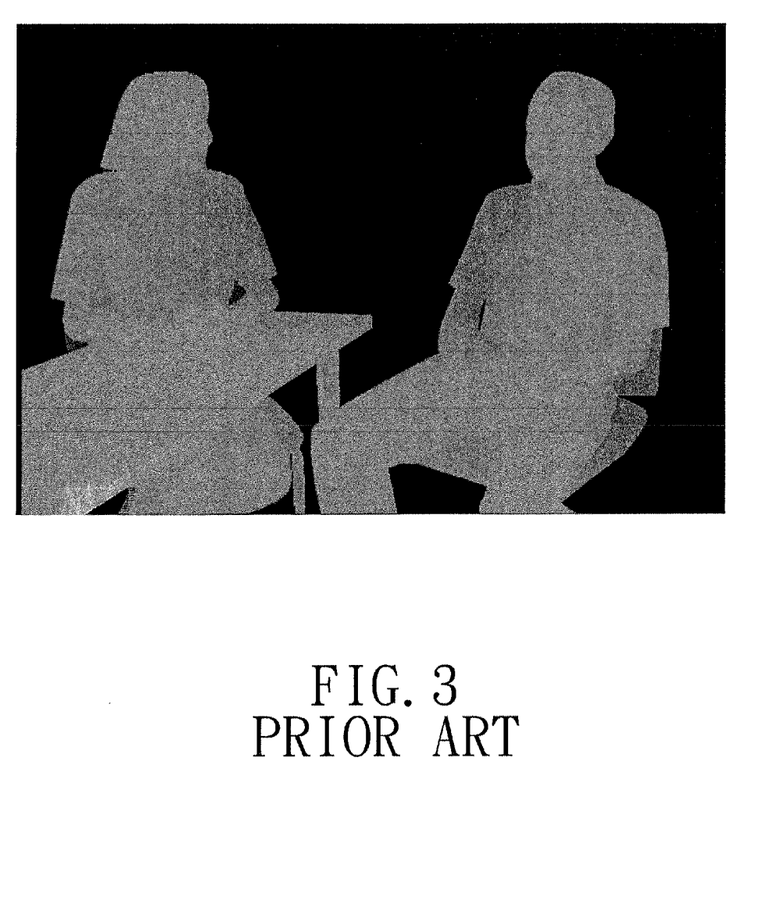
FIG. 3 is a picture showing a depth map corresponding to a foreground image region of the two-dimensional image of FIG. 2.
Figure 4:
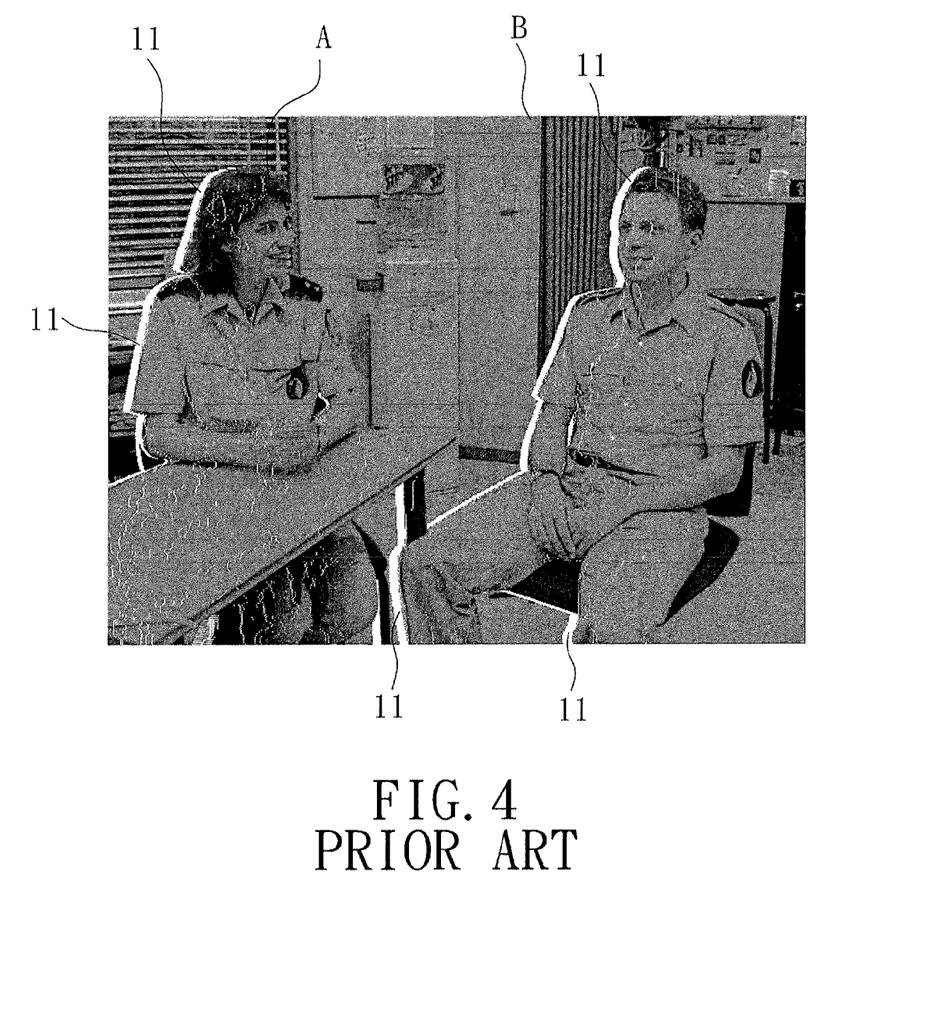
FIG. 4 is a picture showing a left virtual view image warped from the two-dimensional image of FIG. 2.

FIG. 1 illustrates the Depth-Image-Based Rendering (DIBR) technology capable of generating a three-dimensional image by using a two-dimensional image, and a depth map generated by a depth detector (not shown) and corresponding to the two-dimensional image. In the DIRB technology, the two-dimensional image is processed based on the depth map using image warping to generate various virtual view images, such as left virtual view images. For example, FIG. 2 shows an example of the two-dimensional image, FIG. 3 shows an example of the depth map corresponding to a foreground image region of the two-dimensional image of FIG. 2, and FIG. 4 shows an example of the left virtual view image warped from the two-dimensional image of FIG. 2. However, the DIBR technology has intrinsic limitations. Holes caused by insufficient pixel values in the two-dimensional image appear in the warped virtual view images because the holes do not have correspondence to the two-dimensional image. For example, in FIG. 4, a plurality of holes 11 are generally formed in boundaries between a foreground image region (A) and a background image region (B) of the two-dimensional image. Thus, the holes in each warped virtual view image would be filled using hole-filling technology. Finally, the filled virtual view images are combined together to form the three-dimensional image.

A conventional hole-filling method (hereinafter referred to as the first conventional method) has been proposed in an article by Criminisi et al., entitled "Region Filling and Object Removal by Exemplar-Based Image Inpainting", IEEE Transaction on Image Processing, vol. 13, No. 9, September 2004. In the first hole-filling method, an original image is searched to select an image region most similar to a target image region containing holes as a candidate image region for filling the holes within the target image region. Such method requires a lot of effort and takes a great deal of time, thereby resulting in an inferior efficiency. In addition, because the candidate image region is selected from the whole original image, the candidate image region may be selected from a foreground image region of the original image. Therefore, distortions may occur in the filled image.

Another conventional hole-filling method (hereinafter referred to as the second conventional method) has been proposed in an article by Lou et at., entitled "Depth-aided Inpainting for Restoration of Multi-view Images Using Depth-Image-Based Rendering", Journal of Zhejiang University SCIENCE A, pp. 1738-1749, 2009 10(12). In the second hole-filling method, a candidate image region for filling holes in an original image would not be selected from a foreground image region of the original image. In order to save processing time, searching range is reduced to a range around the holes. However, improvements may be made to the second hole-filling method.

SUMMARY OF THE INVENTION

Therefore, an object of the present invention is to provide a method of filling a hole in a virtual view image warped from a two-dimensional image that can overcome the aforesaid drawbacks of the prior art.

According to the present invention, there is provided a method of filling a hole in a virtual view image warped from a two-dimensional image. The virtual view image includes a foreground image region and a background image region. The method comprises the steps of:

a) detecting the hole to determine the number (N) of pixels in the hole, where $N \geq 1$, and to obtain position information corresponding to the number (N) of the pixels in the hole;

b) for each of the number (N) of the pixels in the hole, selecting, from the virtual view image, a target image block that contains at least a corresponding one of the pixels in the hole;

c) selecting, from the virtual view image, a number (P) of search image blocks, each of which has a central pixel that is disposed on one of the upside, downside, right and left of a central pixel of the target image block, and detecting whether each of the number (P) of the search image blocks is available so as to determine which ones out of the number (P) of the search image blocks are available;

d) upon determining in step c) that a number (Q) of the search image blocks are available, where $1 \leq Q \leq P$, estimating each of the number (Q) of the search image blocks using a predetermined estimation manner to generate an estimating value for each corresponding one of the number (Q) of the search image blocks; and e) selecting, based on the estimating values generated in step d), one of the number (Q) of the search image blocks as a candidate image block, and filling each of all pixels in the target image block with a corresponding pixel value in the candidate image block.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 5:
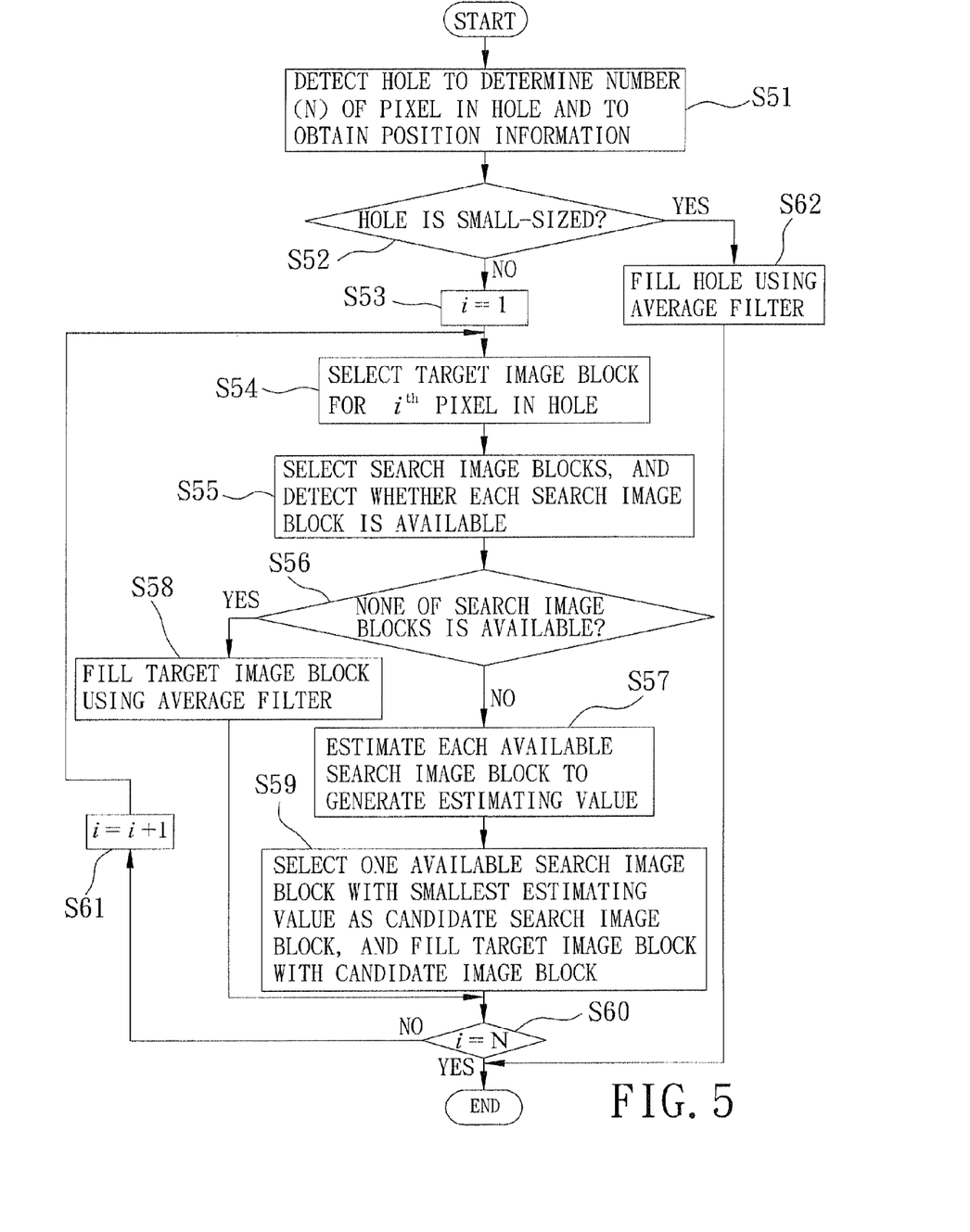
FIG. 5 is a flow chart illustrating the first preferred embodiment of a method of filling a hole in a virtual view image warped from a two-dimensional image according to the present invention.

FIG. 5 shows a flow chart illustrating the first preferred embodiment of a method of filling a hole in a virtual view image warped from a two-dimensional image according to the present invention. The virtual view image is generated from the two-dimensional image based on a depth map (not shown) corresponding to the two-dimensional image.

In step S51, the hole is detected to determine the number (N) of pixels in the hole, where N≧1, and to obtain position information corresponding to the number (N) of the pixels in the hole. In this embodiment, the position of each pixel in the hole can be detected according to the following Function (1):

$$\text{buffer}(x, y) = \pm \frac{t_x}{2}\frac{f}{Z}, \text{ non-hole pixel} \quad \text{Function (1)}$$
$$= \text{null, hold pixel}$$

where $t_x$ is a distance between human eyes, f is a focal distance of human eyes, and Z is a gray-level value of a pixel in the depth map located at a position (x, y). As such, if the function value of buffer (x, y) is null, the pixel in the virtual view image located at the position (x, y) is regarded as a hole-pixel and is labeled.

Figure 6:
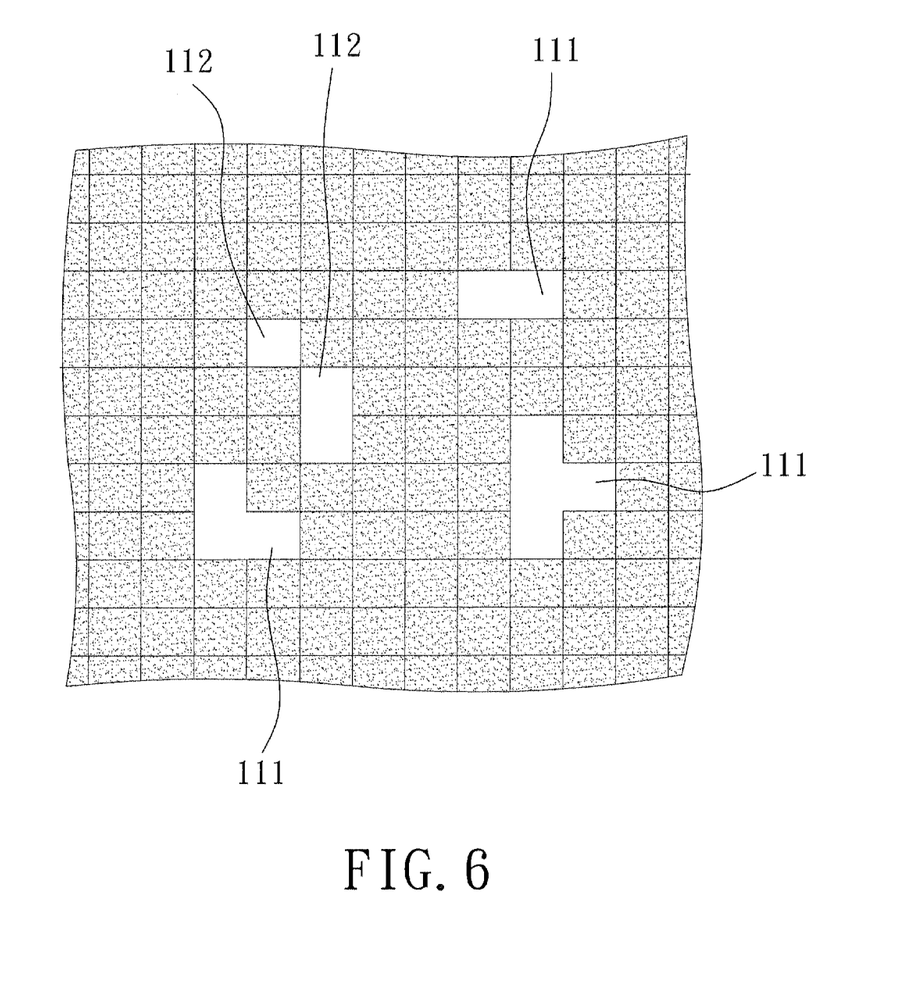
FIG. 6 is a fragmentary schematic view showing a virtual view image having various holes.

In step S52, it is determined based on the position information obtained in step S51 whether the hole is a small-sized hole. If the result is negative, the flow goes to step S53. Otherwise, the flow proceeds to step S62. In this embodiment, the small-size hole is in the form of one of a 1×1 array region and a 1×2 array region. For example, in FIG. 6, holes 112 are classified as small-sized holes while holes 111 are not classified as small-sized holes.

In step S53, initially, a parameter (i) is set to 1.

In step S54, for an $i^{th}$ one of the number (N) of the pixels in the hole, where 1≦i≦N, a target image block is selected from the virtual view image. The target image block contains at least the $i^{th}$ one of the pixels in the hole. In this embodiment, the $i^{th}$ pixel in the hole is a central pixel of the target image block. In addition, initially, the first pixel (i.e., i=1) in the hole is located at an uppermost and leftmost position in the virtual view image. The target image block is a square block that is preferably in the form of one of a 5×5 array region, a 7×7 array region, and a 9×9 array region. For example, referring to FIG. 7, a target image block 14 is a 7×7 array region, and the central pixel 141 of the target image block 14 is the $i^{th}$ pixel in the hole.

In step S55, a number (P) of search image blocks are selected from the virtual view image. Each of the number (P) of the search image blocks has a central pixel that is disposed on one of the upside, downside, right, and left of the central pixel of the target image block. In this embodiment, the search image blocks are square blocks, and have the same size as that of the target image block. The target image block overlaps each of the number (P) of the search image blocks. Preferably, the number of the search image blocks, the central pixels of which are disposed on each of the upside, downside, left and right of the central pixel of the target image block, is equal to two or three. In addition, the search image blocks, the central pixels of which are disposed on each of the upside, downside, left and right of the central pixel of the target image block, overlap each other. The number (P) of the search image blocks are selected in order so that centers of the number (P) of the search image blocks are arranged along a helical-like line. The central pixel of a first one of the number (P) of the search image blocks is a nearmost neighbor of the central pixel of the target image block. More specifically, the number (P) is a multiple of 4, i.e., P=4M, where M≧1. As such, $(4j-3)^{th}$, $(4j-2)^{th}$, $(4j-1)^{th}$ and $(4j)^{th}$ search image blocks are arranged along a $j^{th}$ circle portion of the helical-like line, where 1≦j≦M.

Figure 7:
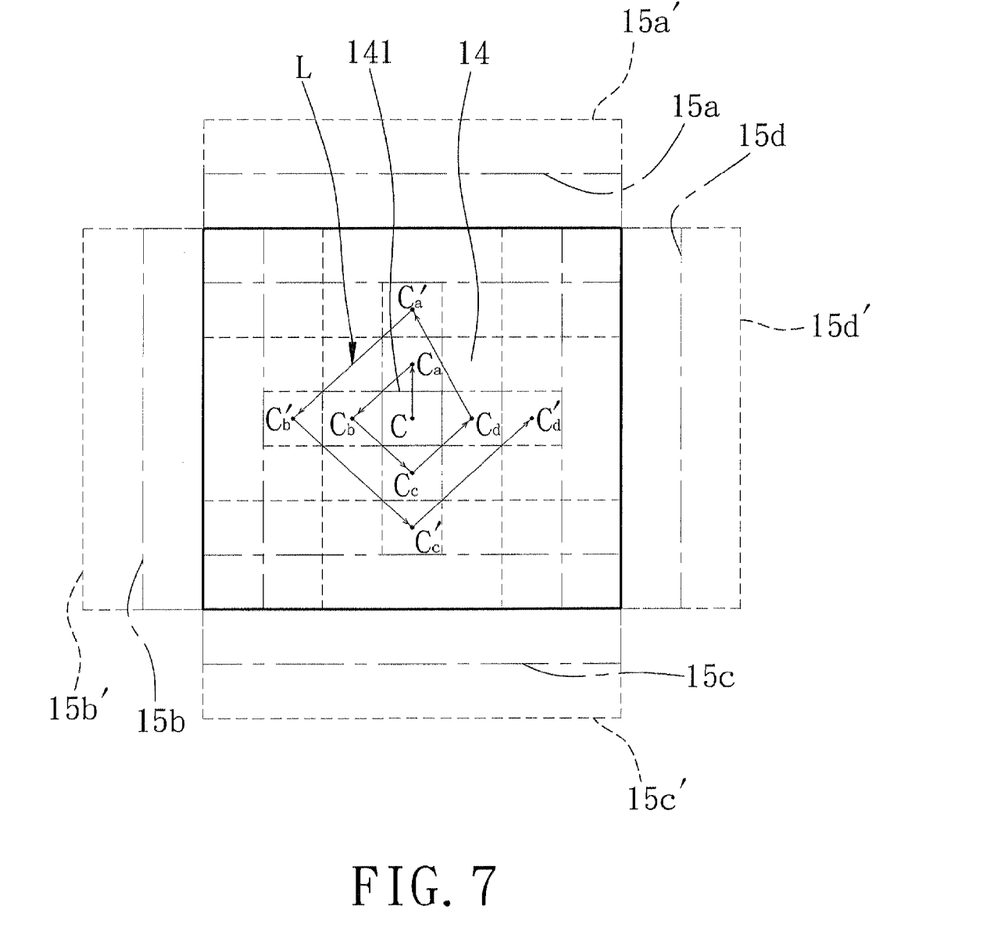
FIG. 7 is a schematic view illustrating how the first preferred embodiment selects search image blocks corresponding to a target image block.

In the example shown in FIG. 7, there are eight search image blocks (15a, 15b, 15c, 15d, 15a', 14b', 15c', 15d') that are selected in order, i.e., P=8=4×2 and M=2. The target image block 14 overlaps each of the search image blocks (15a, 15b, 15c, 15d, 15a', 14b', 15c', 15d'). The search image blocks (15a, 15a') overlap each other by a 7×6 array region, and have central pixels disposed on the upside of the central pixel 141 of the target image block 14. The search image blocks (15b, 15b') overlap each other by a 6×7 array region, and have central pixels disposed on the left of the central pixel 141 of the target image block 14. The search image blocks (15c, 15c') overlap each other by a 7×6 array region and have central pixels disposed on the downside of the central pixel 141 of the target image block 14. The search image blocks (15d, 15d') overlap each other by a 6×7 array region and have central pixels disposed on the right of the central pixel 141 of the target image block 14. The search image block (15a) is first selected, and its central pixel is disposed on the upside of the central pixel 141 of the target image block 14 and is a nearmost neighbor of the central pixel 141 of the target image block 14. As such, centers ($C_a$, $C_b$, $C_c$, $C_d$, $C_a'$, $C_b'$, $C_c'$, $C_d'$) of the search image blocks (15a, 15b, 15c, 15d, 15a', 14b', 15c', 15d') are arranged along a two-circle counterclockwise helical-like line (L). The search image blocks (15a, 15b, 15c, 15d) are arranged along a first circle portion of the helical-like line (L). The search image blocks ($15_a'$, $15_b'$, $15_c'$, $15_d'$) are arranged along a second circle portion of the helical-like line (L).

In addition, in step S55, it is detected whether each of the number (P) of the search image blocks is available or not so as to determine which ones of the number (P) of the search image blocks are available. In this embodiment, any one of the search image blocks containing any hole-pixel or any pixel in the foreground image region of the virtual view is regarded as an unavailable search image block.

In step S56, it is determined whether none of the search image blocks is available. If the result is affirmative, the flow goes to step S58. Otherwise, the flow proceeds to step S57.

In step S57, upon determining in step S56 that a number (Q) of the search image blocks are available, where 1≦Q≦P, each of the number (Q) of the search image blocks is estimated using a predetermined estimation manner to generate an estimating value for each corresponding one of the number (Q) of the search image blocks. In this embodiment, the predetermined estimation manner is configured to calculate an absolute difference between each of pixel values in the target image region and a corresponding one of pixel values in each of the number (Q) of the search image blocks to obtain a sum of the absolute differences that serves as the estimating value corresponding to a corresponding one of the number (Q) of the search image blocks.

In step S58, upon determining in step S56 that none of the number (P) of the search image blocks is available, pixels in the target image block without any pixel value is filled using an average filter. Thereafter, the flow goes to step S60.

In step S59, one of the number (Q) of the search image blocks is selected as a candidate image block based on the estimating values corresponding to the number (Q) of the search image blocks. Each of all pixels in the target image block is filled with a corresponding one of all pixel values in the candidate image block. In this embodiment, the estimating value corresponding to the candidate image block is smallest.

In step S60, it is determined whether the parameter (i) is equal to N. If the result is affirmative, the flow ends. Otherwise, the flow goes to step S61.

In step S61, the parameter (i) is set to i+1. Then, the flow goes back to step S54. That is, the flow is performed for an $(i+1)^{th}$ pixel in the hole. In this embodiment, the $(i+1)^{th}$ pixel is disposed on the right or the downside of the $i^{th}$ pixel.

In step S62, when the hole is the small-sized hole, the hole is filled using an average filter. Then, the flow ends.

Figure 8:
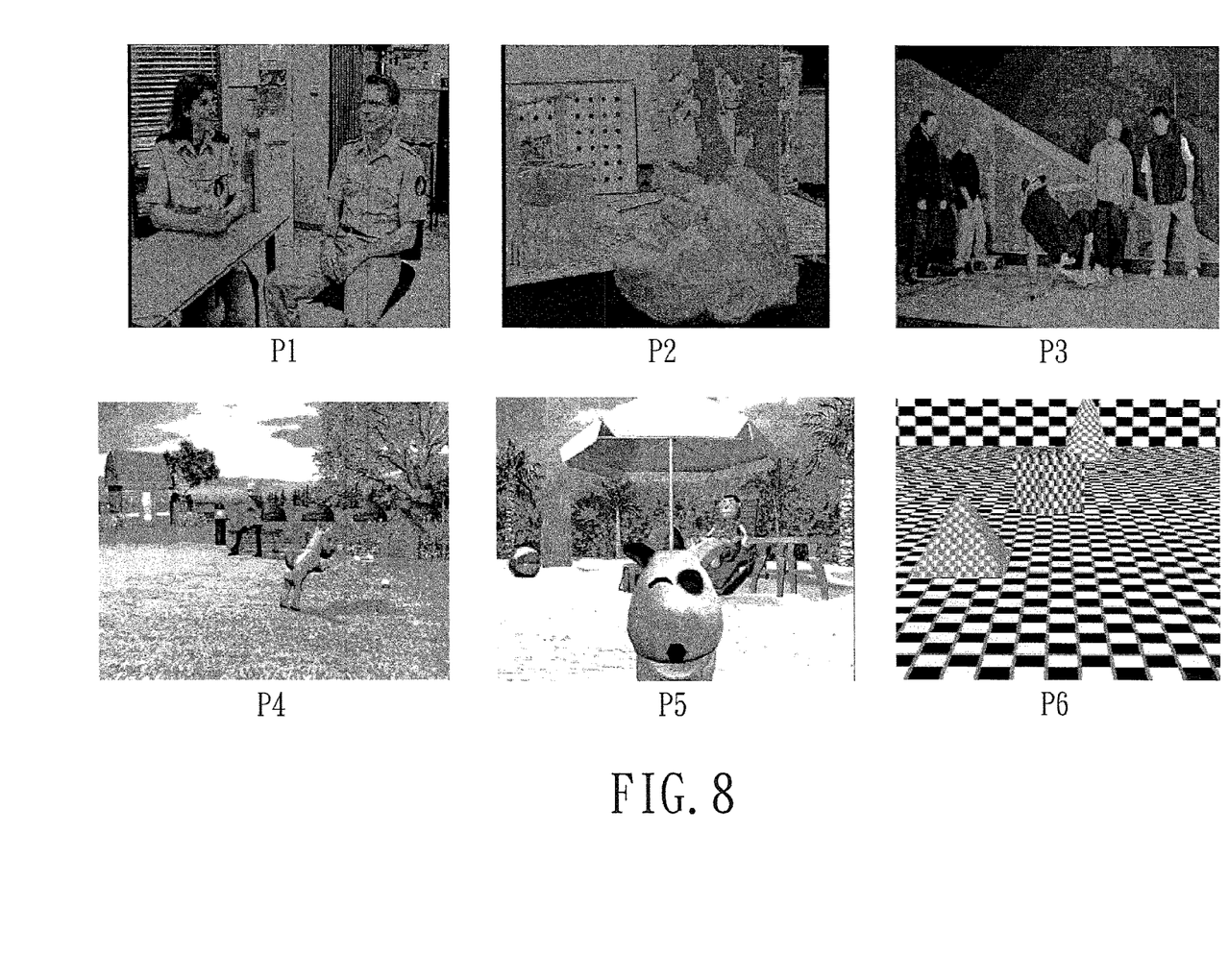
FIG. 8 shows various two-dimensional test images.

FIG. 8 illustrates six two-dimensional test images (P1, P2, P3, P4, P5, P6) provided from "The Middlebury Computer Vision Pages" (http://vision.middlebury.edu/). In an experiment for filling all holes in a left virtual view image warped from each of the test two-dimensional images (P1, P2, P3, P4, P5, P6) using the conventional first and second methods, and the first preferred embodiment, the experimental results related to processing time required by each of the conventional first and second methods and the first preferred embodiment, and peak signal-to-noise ratio (PSNR) for the filled left virtual view image generated using each of the conventional first and second methods and the first preferred embodiment are shown in Table 1 below. In this experiment, the target image block is a 7×7 array region, and the number (P) of the search image blocks is 8.

TABLE 1

| Image | Method | Processing time (sec) | PSNR(dB) |
|---|---|---|---|
| P1 | First conventional method | 1025.17 | 21.02 |
|  | Second Conventional method | 155.98 | 21.23 |
|  | First preferred embodiment | 0.4 | 20.86 |
| P2 | First conventional method | 554.87 | 23.36 |
|  | Second Conventional method | 154.14 | 23.36 |
|  | First preferred embodiment | 0.32 | 22.69 |
| P3 | First conventional method | 1155.87 | 25.89 |
|  | Second conventional method | 239.15 | 24.17 |
|  | First preferred embodiment | 0.69 | 24.3 |
| P4 | First conventional method | 104.25 | 16.06 |
|  | Second conventional method | 28.68 | 16.23 |
|  | First preferred embodiment | 0.21 | 16.07 |
| P5 | First conventional method | 397.78 | 21.49 |
|  | Second conventional method | 206.12 | 21.73 |
|  | First preferred embodiment | 0.78 | 21.38 |
| P6 | First conventional method | 179.86 | 19.71 |
|  | Second conventional method | 48.72 | 19.72 |
|  | First preferred embodiment | 0.42 | 19.71 |

As shown in Table 1, the first preferred embodiment can provide PSNR similar to that of the conventional first and second methods. Particularly, the first preferred embodiment can reduce processing time by over 90% as compared to the conventional first and second methods. It is noted that, in this experiment, the first preferred embodiment first processes the small-sized holes in the left virtual view image warped from each of the test two-dimensional images (P1, P2, P3, P4, P5, P6), and then processes the remaining holes in the same. Alternatively, the holes in the left virtual view image warped from each of the test two-dimensional images (P1, P2, P3, P4, P5, P6) can be processed in order.

Furthermore, in this embodiment, processing time depends on the size of the target image block selected in step S54. In another experiment for filling all holes in a left virtual view image warped from each of the test two-dimensional images (P1, P2, P3, P4, P5, P6) using the first preferred embodiment based on different sizes of the target image block, such as 11×11, 9×9, 7×7, 5×5 and 3×3 array regions, the experimental results related to processing time are shown in Table 2 below. In this experiment, the number (P) of the search image blocks is 8.

TABLE 2

| Image |  | 11 × 11 | 9 × 9 | 7 × 7 | 5 × 5 | 3 × 3 |
|---|---|---|---|---|---|---|
| P1 | Processing | 0.79 | 0.83 | 0.4 | 0.31 | 0.25 |
| P2 | Time | 0.74 | 0.46 | 0.33 | 0.26 | 0.22 |
| P3 | (sec) | 1.55 | 1.03 | 0.69 | 0.53 | 0.42 |
| P4 |  | 0.32 | 0.24 | 0.22 | 0.21 | 0.19 |
| P5 |  | 2.90 | 1.60 | 0.82 | 0.41 | 0.24 |
| P6 |  | 1.14 | 0.69 | 0.41 | 0.27 | 0.22 |

As shown in Table 2, for the target image block with the 11×11 or 9×9 array region, processing time increases. However, for the target image block with the 3×3 array region, processing time is shortest but PSNR will be worst.

Furthermore, in this embodiment, processing time also depends on the number (P) of the search image blocks selected in step S55, where P=4M, and M is the number of circle portions of the helical-like line. In a further experiment for filling all holes in a left virtual view image warped from each of the test two-dimensional images (P1, P2, P3, P4, P5, P6) using the first preferred embodiment based on p=4, 8, 12, 16 and 20, the experimental results related to processing time are shown in Table 3 below.

TABLE 3

| P |  | P1 | P2 | P3 | P4 | P5 | P6 |
|---|---|---|---|---|---|---|---|
| 4 | Processing | 0.27 | 0.29 | 0.66 | 0.21 | 0.42 | 0.26 |
| 8 | Time | 0.4 | 0.32 | 0.69 | 0.22 | 0.78 | 0.42 |
| 12 | (sec) | 0.59 | 0.44 | 0.89 | 0.27 | 1.3 | 0.59 |
| 16 |  | 0.87 | 0.71 | 1.14 | 0.33 | 1.95 | 0.83 |
| 20 |  | 1.28 | 0.84 | 1.43 | 0.35 | 2.76 | 1.17 |

As shown in Table 3, the processing time increases very much when P=16 or 20. Although the processing time is shortest when p=4, PSNR under the same conditions is poor. As a result, P is preferably 8 or 12.

Figure 9:
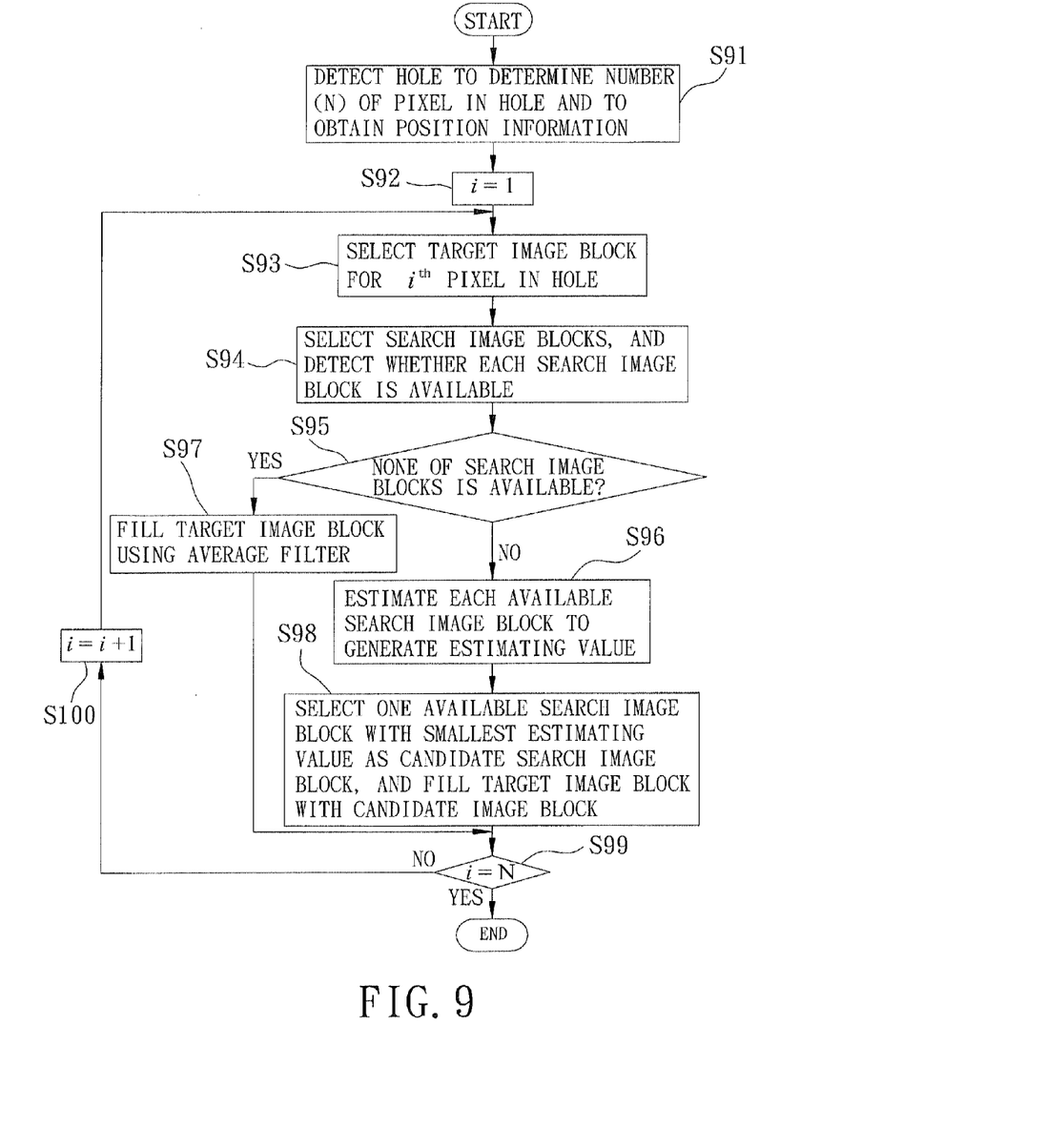
FIG. 9 is a flow chart illustrating the second preferred embodiment of a method of filling a hole in a virtual view image warped from a two-dimensional image according to the present invention.

FIG. 9 shows a flow chart illustrating the second preferred embodiment of a method of filling a hole in a virtual view image warped from a two-dimensional image according to the present invention, which is a modification of the first preferred embodiment. In this embodiment, steps S52 and S62 of the first preferred embodiment are omitted. In other words, the second preferred embodiment does not detect whether the hole is a small-sized hole. Steps S91 to S100 correspond respectively to steps S51, and S53 to S61.

In a further experiment for filling all holes in a left virtual view image warped from each of the above test two-dimensional images (P1, P2, P3, P4, P5, P6) using the first and second preferred embodiments, the experimental results related to processing time required by each of the first and second preferred embodiments, and peak signal to noise ratio (PSNR) for the filled left virtual view image generated using each of the first and second preferred embodiments are shown in Table 1 below. In this experiment, the target image block is a 7×7 array region, and the number (P) of the search image blocks is 8.

TABLE 4

| Image | Method | Processing time (sec) | PSNR(dB) |
|---|---|---|---|
| P1 | First preferred embodiment | 0.4 | 20.86 |
|  | Second preferred embodiment | 1.06 | 20.87 |
| P2 | First preferred embodiment | 0.32 | 22.69 |
|  | Second preferred embodiment | 1.33 | 22.72 |
| P3 | First preferred embodiment | 0.69 | 24.3 |
|  | Second preferred embodiment | 2.0 | 24.32 |
| P4 | First preferred embodiment | 0.21 | 16.07 |
|  | Second preferred embodiment | 0.3 | 16.09 |
| P5 | First preferred embodiment | 0.78 | 21.38 |
|  | Second preferred embodiment | 2.72 | 21.4 |
| P6 | First preferred embodiment | 0.42 | 19.71 |
|  | Second preferred embodiment | 0.97 | 19.71 |

As shown in Table 4, the second preferred embodiment can provide PSNR similar to that of the first preferred embodiment. However, the second preferred embodiment has relatively longer processing time as compared to the first preferred embodiment.

In sum, the method of this invention can ensure certain quality (PNSR) of the filled virtual view image, while effectively reducing processing time compared to the prior art.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method of filling a hole in a virtual view image warped from a two-dimensional image, the hole having a number (N) of pixels, where $N \geq 1$, the virtual view image including a foreground image region and a background image region, said method comprising the steps of:
   a) detecting the hole to determine the number (N) of pixels in the hole, where $N \geq 1$, and to obtain position information corresponding to the number (N) of the pixels in the hole;
   b) for each of the number (N) of the pixels in the hole, selecting, from the virtual view image, a target image block that contains at least a corresponding one of the pixels in the hole;
   c) selecting, from the virtual view image, a number (P) of search image blocks, each of which has a central pixel that is disposed on one of the upside, downside, right and left of a central pixel of the target image block, and detecting whether each of the number (P) of the search image blocks is available so as to determine which ones of the number (P) of the search image blocks are available;
   d) upon determining in step c) that a number (Q) of the search image blocks are available, where $1 \leq Q \leq P$, estimating each of the number (Q) of the search image blocks using a predetermined estimation manner to generate an estimating value corresponding to a corresponding one of the number (Q) of the search image blocks; and
   e) selecting, based on the estimating values generated in step d), one of the number (Q) of the search image blocks as a candidate image block, and filling each of all pixels in the target image block with a corresponding one of all pixel values in the candidate image block.

2. The method as claimed in claim 1, wherein the target image block selected in step b) and the search image blocks selected in step c) are square blocks and have the same size.

3. The method as claimed in claim 2, wherein the square blocks are in the form of one of a 5×5 array region, a 7×7 array region, and a 9×9 array region.

4. The method as claimed in claim 2, wherein the target image block selected in step b) overlaps each of the search image blocks selected in step c).

5. The method as claimed in claim 2, wherein, in step c):
   the number of the search image blocks, the central pixels of which are disposed on each of the upside, downside, left and right of the central pixel of the target image block, is equal to two or three; and
   the search image blocks, the central pixels of which are disposed on each of the upside, downside, left and right of the central pixel of the target image block, overlap each other.

6. The method as claimed in claim 1, wherein, in step c):
   the number (P) of the search image blocks are selected in order so that centers of the number (P) of the search image blocks are arranged along a helical-like line; and
   the central pixel of a first one of the number (P) of the search image blocks is a nearmost neighbor of the central pixel of the target image block.

7. The method as claimed in claim 1, wherein, in step d), each of the number (Q) of the search image blocks does not contain any hole-pixel and any pixel in the foreground image region of the virtual view image.

8. The method as claimed in claim 7, wherein:
   in step d), the predetermined estimation manner is configured to calculate an absolute difference between each of pixel values in the target image region and a corresponding one of pixel values in each of the number (Q) of the search image blocks to obtain a sum of the absolute differences that serves as the estimating value corresponding to a corresponding one of the number (Q) of the search image blocks; and
   in step e), the estimating value corresponding to the candidate image block is smallest.

9. The method as claimed in claim 1, prior to step b), further comprising the step of
   a-1) determining, based on the position information obtained in step a), whether the hole is a small-sized hole;
   wherein, upon determining in step a-1) that the hole is not the small-sized hole, step b) is performed.

10. The method as claimed in claim 9, prior to step b), further comprising the step of
    a-2) upon determining in step a-1) that the hole is the small-sized hole, filling the hole using an average filter.

11. The method as claimed in claim 9, wherein, in step a-1), the small-sized hole is in the form of one of a 1×1 array region and a 1×2 array region.

12. The method as claimed in claim 1, further comprising the step of
    f) upon determining in step c) that none of the number (P) of the search image blocks is available, filling pixels in the target image region without any pixel value using an average filter.

* * * * *